United States Patent
Koyama

(10) Patent No.: US 10,642,254 B2
(45) Date of Patent: May 5, 2020

(54) NUMERICAL CONTROLLER AND METHOD OF CONTROLLING A NUMERICAL CONTROLLER

(71) Applicant: FANUC CORPORATION, Yamanashi (JP)

(72) Inventor: Yasuaki Koyama, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 118 days.

(21) Appl. No.: 16/039,562

(22) Filed: Jul. 19, 2018

(65) Prior Publication Data

US 2019/0033830 A1 Jan. 31, 2019

(30) Foreign Application Priority Data

Jul. 26, 2017 (JP) ................................ 2017-144059

(51) Int. Cl.
*B24B 25/00* (2006.01)
*G06F 15/16* (2006.01)
(Continued)

(52) U.S. Cl.
CPC ....... *G05B 19/4155* (2013.01); *G05B 19/184* (2013.01); *G05B 19/042* (2013.01);
(Continued)

(58) Field of Classification Search
CPC ................ G05B 19/184; G05B 19/042; G05B 19/4145; G05B 19/408;
(Continued)

(56) References Cited

U.S. PATENT DOCUMENTS 5,019,763 A * 5/1991 Komatsu .............. G05B 19/184
318/39
5,877,970 A * 3/1999 Nesbit .................... A63B 53/02
703/1
(Continued)

FOREIGN PATENT DOCUMENTS

CN 1489013 A 4/2004
CN 101987039 A 3/2011
(Continued)

OTHER PUBLICATIONS

Catalin Buiu et al., A software tool for modeling and simulation of numerical P systems, 2011, [Retrieved on Feb. 25, 2020]. Retrieved from the internet: <URL: https://pdf.sciencedirectassets.com/271079/1-s2.0-S0303264711X00035/1-s2.0-S0303264710002157/main.pdf?> 6 Pages (442-447) (Year: 2011).*
(Continued)

*Primary Examiner* — Anibal Rivera
(74) *Attorney, Agent, or Firm* — Robert P. Michal, Esq.; Carter, DeLuca & Farrell LLP

(57) ABSTRACT

A numerical controller in which a plurality of software packages using the same type of parameters are installed includes a parameter storage unit having a plurality of storage areas for storing the parameters, for each of parameter types, and a storage unit configured to store, for each of the software packages, a parameter information file in which information of the storage areas used by each of the software packages is described for each of the parameter types.

19 Claims, 9 Drawing Sheets

(51) Int. Cl.
    *G06F 17/50*     (2006.01)
    *H04L 12/26*     (2006.01)
    *G05B 19/4155*     (2006.01)
    *G05B 19/18*     (2006.01)
    *G05B 19/408*     (2006.01)
    *G05B 19/4065*     (2006.01)
    *G05B 19/414*     (2006.01)
    *G05B 19/042*     (2006.01)

(52) U.S. Cl.
    CPC ........ *G05B 19/408* (2013.01); *G05B 19/4065* (2013.01); *G05B 19/4145* (2013.01); *G05B 2219/31418* (2013.01); *G05B 2219/32128* (2013.01); *G05B 2219/34279* (2013.01); *G05B 2219/35026* (2013.01)

(58) Field of Classification Search
    CPC ........... G05B 2219/32128; G05B 2219/34279; G05B 2219/31418; G05B 2219/35026; G05B 19/4065; G06F 17/50
    See application file for complete search history.

(56) References Cited

U.S. PATENT DOCUMENTS

| | | | | |
|---|---|---|---|---|
| 5,914,876 | A * | 6/1999 | Hirai | G05B 19/408 700/181 |
| 5,984,499 | A * | 11/1999 | Nourse | G05B 19/4145 700/169 |
| 8,102,869 | B2 * | 1/2012 | Brown | H04L 67/02 370/419 |
| 10,160,082 | B2 * | 12/2018 | Agudelo | B23Q 17/0995 |
| 10,195,708 | B2 * | 2/2019 | Agudelo | B23Q 17/0995 |
| 2002/0049512 | A1 | 4/2002 | Mizuno et al. | |
| 2004/0039484 | A1 | 2/2004 | Watanabe et al. | |
| 2006/0229760 | A1 | 10/2006 | Suzuki et al. | |
| 2011/0125900 | A1 * | 5/2011 | Janssen | G05B 19/042 709/225 |
| 2015/0140899 | A1 * | 5/2015 | Guo | B24B 25/00 451/5 |
| 2016/0246897 | A1 * | 8/2016 | Kannan | G06F 30/00 |
| 2017/0034023 | A1 * | 2/2017 | Nickolov | H04L 43/0817 |
| 2018/0085877 | A1 * | 3/2018 | Agudelo | G05B 19/4065 |
| 2018/0085878 | A1 * | 3/2018 | Agudelo | G05B 19/048 |

FOREIGN PATENT DOCUMENTS

| | | |
|---|---|---|
| CN | 106796425 A | 5/2017 |
| JP | 11-120083 A | 4/1999 |
| JP | 2004-86311 A | 3/2004 |
| JP | 2006-293544 A | 10/2006 |
| JP | 2006293544 A | 10/2006 |
| JP | 2015138362 A | 7/2015 |

OTHER PUBLICATIONS

Michael J. Wesley et al., Remember the Future II: Meta-analyses and Functional Ovelap of Working Memory and Delay Discount, 2014, [Retrieved on Feb. 25, 2020]. Retrieved from the internet: <URL: https://pdf.sciencedirectassets.com/271200/1-s2.0-S0006322314X0003X/.pdf?> 14 Pages (435-448) (Year: 2014).*

Decision to Grant a Patent issued by the Japanese Patent Office in relation to Japanese Application No. 2017-144059 dated May 7, 2019 (3 pages) along with an English language translation (2 pages).

* cited by examiner

FIG. 2

```
<information>
  <name>AUXILIARY SOFTWARE A</name>
  <version>1.0.0</version>
  <parameter>
    <pmc_x>
      <range min=" 200" max=" 212" />
      <range min=" 214" max=" 215" />
    </pmc_x>
    <pmc_y>
      <range min=" 200" max=" 212" />
    </pmc_y>
    <pmc_r>
      <range min=" 2000" max=" 2003" />
    </pmc_r>
    ...
    <program>
      <range min=" 8000" max=" 8003" />
    </program>
    <macro_val>
      <range min=" 800" max=" 813" />
    </macro_val>
    ...
  </parameter>
</information>
```

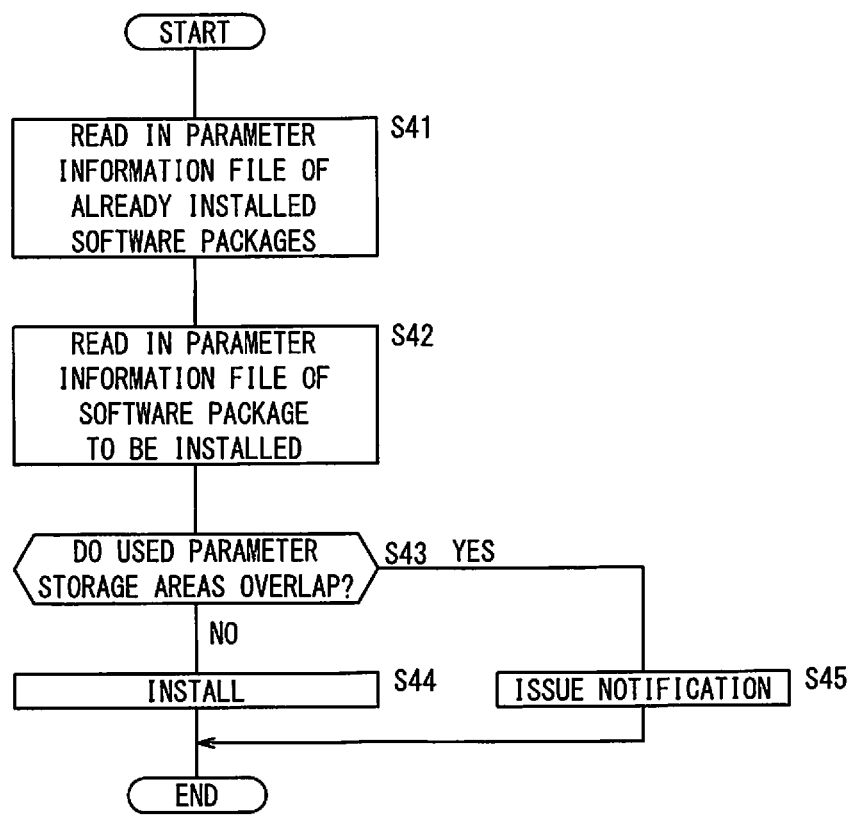

NUMERICAL CONTROLLER AND METHOD OF CONTROLLING A NUMERICAL CONTROLLER

CROSS-REFERENCE TO RELATED APPLICATION

This application is based upon and claims the benefit of priority from Japanese Patent Application No. 2017-144059 filed on Jul. 26, 2017, the contents of which are incorporated herein by reference.

BACKGROUND OF THE INVENTION

Field of the Invention

The present invention relates to a numerical controller which is capable of installing a plurality of software packages that use the same type of parameters, as well as a method of controlling such a numerical controller.

Description of the Related Art

In Japanese Laid-Open Patent Publication No. 2004-086311, a technique is disclosed in which operation programs and parameters for a machine tool, a jig, a robot, and a visual sensor are simultaneously displayed on the same screen.

SUMMARY OF THE INVENTION

In a numerical controller, software packages (hereinafter referred to as auxiliary software packages) for adding auxiliary functions of the machine tool are installed, and among the auxiliary software packages, some software packages utilize parameters of the same type as parameters used in a numerical control. In a main storage device or the like, storage areas for storing the parameters are set in advance for each of the parameter types. However, if the auxiliary software packages rewrite the contents of the parameters stored in the storage areas that are used in the numerical control, there is a concern that the numerical controller may output incorrect machining operation commands to the machine tool. Therefore, it is necessary to manage the storage areas for the parameters used by the respective software packages.

Since the types of parameters used by the machine tool, the jig, the robot, and the visual sensor differ for each of such devices, even if the technique of Japanese Laid-Open Patent Publication 2004-086311 is used, concerning plural software packages that utilize the same type of parameters, it has not been possible to manage the storage areas for such parameters.

The present invention has been devised in order to solve the aforementioned problem, and has the object of providing a numerical controller and a method of controlling the numerical controller, in which it is possible to manage storage areas for parameters used by respective software packages, in relation to a plurality of software packages that utilize the same type of parameters.

An aspect of the present invention is a numerical controller in which a plurality of software packages using the same type of parameters are installed, including a parameter storage unit having a plurality of storage areas for storing the parameters, for each of parameter types, and a storage unit configured to store, for each of the software packages, a parameter information file in which information of the storage areas used by each of the software packages is described for each of the parameter types.

According to the present invention, it is possible to manage storage areas for parameters used by each of the software packages.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a diagram showing an example of information described in a parameter information file;

FIG. 9 is a flowchart showing a process flow performed, in a comparison judgment unit and an installation control unit.

DESCRIPTION OF THE PREFERRED EMBODIMENTS

First Embodiment

[Configuration of Numerical Controller]

Figure 1:
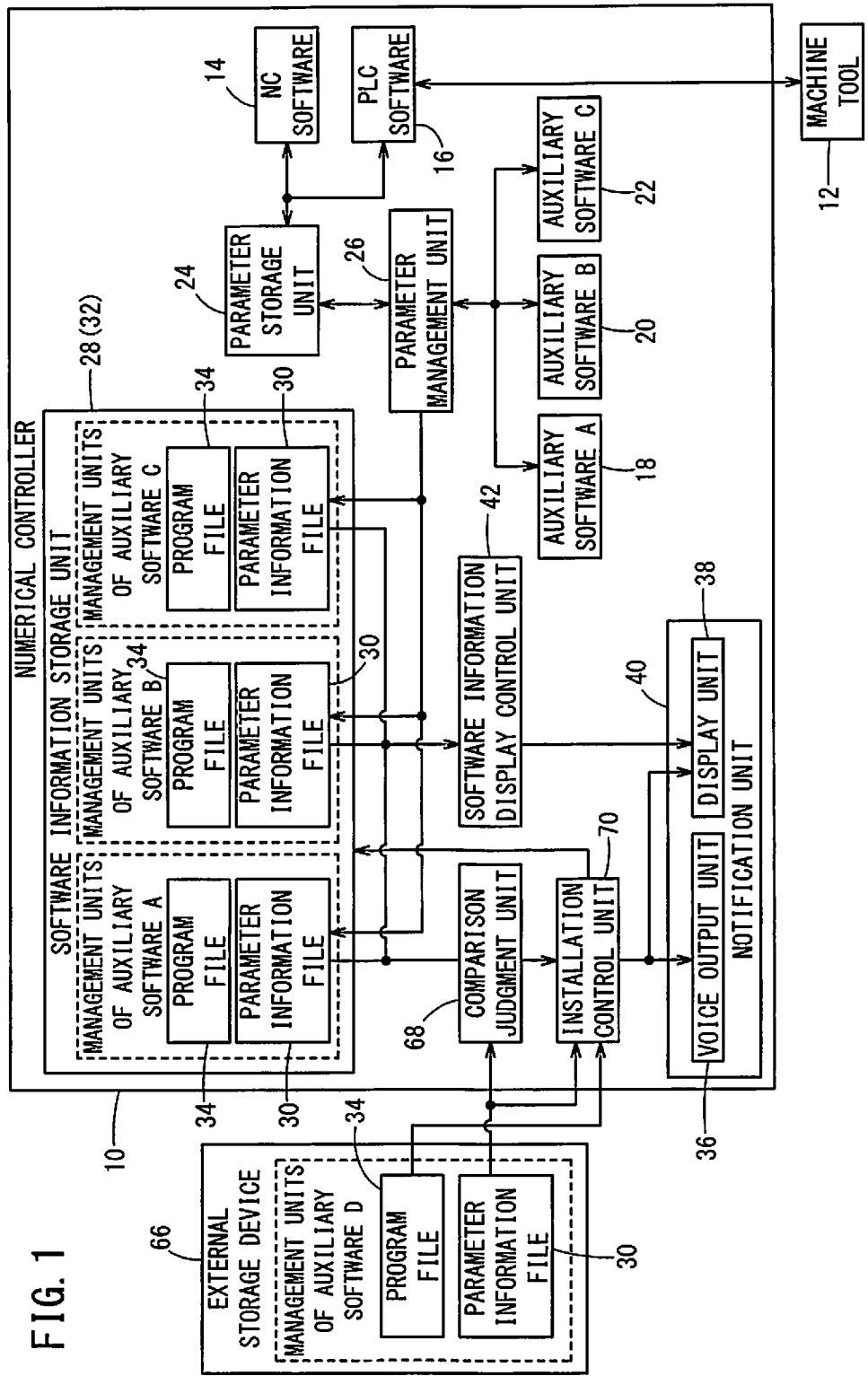
FIG. 1 is a block diagram showing the configuration of a numerical controller.

FIG. 1 is a block diagram showing the configuration of a numerical controller 10. An NC software package 14 for numerically controlling a machine tool 12 is installed in a general purpose personal computer, to thereby enable the computer to function as the numerical controller 10. In the numerical controller 10, there is further installed a PLC software package 16 that carries out a sequence control for the machine tool 12. In addition, the numerical controller 10 is capable of installing various software packages that provide auxiliary functions with respect to machining of the machine tool 12, such as a coolant tank liquid amount management function, a measurement function by a touch probe, and the like. As an example, in the present embodiment, an auxiliary software package A 18, an auxiliary software package B 20, and an auxiliary software package C 22 are installed.

The numerical controller 10 includes a parameter storage unit 24. When the NC software package 14 or the PLC software package 16 is executed, the parameter storage unit 24 is disposed in a main storage device or cache, which is constituted, for example, by a DRAM, an SRAM, or the like. A machining program executed by the NC software package 14, and data used in the machining program, etc., or signals used in a sequence program executed by the PLC software package 16 are stored respectively as parameters in the parameter storage unit 24.

The parameters stored in the parameter storage unit 24 are PLC signals, the machining program, tool offsets, macro variables, workpiece coordinates, and CNC parameters.

The PLC signals include F signals and G signals for carrying out input and output of data between the NC software package 14 and the PLC software package 16, X signals and Y signals for carrying out input and output of data with the machine tool 12 or a non-illustrated external device, and an internal relay R, an extra relay E, a timer T, a counter C, and holding memories K, D used by the sequence program that is executed by the PLC software package 16. The F signals, the G signals, the X signals, the Y signals, the internal relay R, the extra relay E, the timer T, the counter C, and the holding memories K, D, respectively, are independent parameters.

The machining program is a program executed by the NC software package 14 and is described by an M code and a G code. The tool offsets are values of the length of the tool used by the machine tool 12, and the size of the diameter of the tool.

The macro variables are variables used in the machining program. The workpiece coordinates are data of coordinates that serve as reference points for machining positions used in the machining program. The CNC parameters are setting values of the machine tool 12.

The parameters stored in the parameter storage unit 24 are not limited to those described above, and other parameters used for controlling the machine tool 12 may be stored in the parameter storage unit 24. When the NC software package 14 or the PLC software package 16 is initialized, areas (hereinafter referred to as storage areas) for storing the parameters are set for each type of parameter in the parameter storage unit 24. An address is set for each one of the storage areas. For example, 400 individual storage areas are set for the X signals in the parameter storage unit 24, and addresses from 0 to 399 are set therefor.

The above-described parameters are not limited to being used by the NC software package 14 and the PLC software package 16, but are also used by the auxiliary software package A 18, the auxiliary software package B 20, and the auxiliary software package C 22.

For the NC software package 14, the PLC software package 16, the auxiliary software package A 18, the auxiliary software package B 20, and the auxiliary software package C 22, storage areas which are used by the respective software packages are set for each of the parameter types. For example, the auxiliary software package A 18 is set so as to use the storage areas of addresses 200 to 212 and 214 to 215 in relation to the X signals thereof.

The NC software package 14, the PLC software package 16, the auxiliary software package A 18, the auxiliary software package B 20, and the auxiliary software package C 22, which are already installed in the numerical controller 10, are set in a manner so that the parameter storage areas used by the software packages do not overlap with each other. For example, settings are made so that the PLC software package 16 uses the addresses 0 to 199 for the X signals thereof, and the auxiliary software package A 18 uses the addresses 200 to 212 and 214 to 215 for the X signals thereof. Consequently, the contents of the X signals used by the PLC software package 16 are prevented from being overwritten by the auxiliary software package A 18.

The NC software package 14 and the PLC software package 16 are capable of directly writing parameters that are stored in the parameter storage unit 24. However, the auxiliary software package A 18, the auxiliary software package B 20, and the auxiliary software package C 22 are configured so as to write parameters that are stored in the parameter storage unit 24 via a parameter management unit 26. The parameter management unit 26 retains, as historical information, information of the types of parameters that have been written, information of the software packages that have written the parameters, and information of the addresses of the storage areas of the written parameters. Further, in accordance with the retained historical information, the parameter management unit 26 updates parameter information files 30 of a software information storage unit 28, which will be described next. Updating of the parameter information files 30 will be described in detail later.

The numerical controller 10 includes a software information storage unit 28. The software information storage unit 28 is provided, for example, in an auxiliary storage device constituted by a magnetic disk, a flash memory, or the like. The software information storage unit 28 constitutes a storage unit 32.

Program files 34 and the parameter information files 30 of the auxiliary software package A 18, the auxiliary software package B 20, and the auxiliary software package C 22 are stored in the software information storage unit 28. The program files 34 and the parameter information files 30 are paired together and managed in the same folder for each of the auxiliary software package A 18, the auxiliary software package B 20, and the auxiliary software package C 22. The program files 34 and the parameter information files 30 need not necessarily be contained together in the same folder. If information associating the program files 34 and the parameter information files 30 is possessed separately by the respective software packages, the program files 34 and the parameter information files 30 may be placed into different folders.

In the program files 34, information of the programs is described which defines the processes performed by the auxiliary software package A 18, the auxiliary software package B 20, and the auxiliary software package C 22. The program files 34 may be binary files or may be source code files in the case that the software packages are formed of programs written in a scripting language. In the parameter information files 30, information of the storage areas used by the software packages is described for each respective type of parameter. Further, information of the product names and versions of the software packages is described in the parameter information files 30.

It should be noted that the program files and the parameter information files of the NC software package 14 and the PLC software package 16 are not stored in the software information storage unit 28. The NC software package 14 and the PLC software package 16 are preinstalled software packages that are installed beforehand in the numerical controller 10, and the program files therefor are managed separately from the later-installed program files 34 of the auxiliary software package A 18, the auxiliary software package B 20, and the auxiliary software package C 22. Further, concerning the parameter storage areas used by the NC software package 14 and the PLC software package 16, they are described in advance in software package programs (for example, a software information display control unit 42 and a comparison judgment unit 68, to be described later) that utilize such information.

FIG. 2 is a diagram showing an example of information described in the parameter information files 30. The parameter information files 30 are XML format files. An information tag indicates a root element, a name tag indicates the product name of the software package, a version tag indicates the version of the software package, the parameter tag indicates parameters used by the software package, tags such as pmc_x, pmc_y, etc., indicate the type of parameter, and range tags indicate ranges of the parameter storage areas used by the software package. The parameter information files 30 are not limited to being XML format files, but may be written in a different file format. Also, the parameter information files 30 need not be text files, but may be binary files.

The numerical controller 10 includes a voice output unit 36 and a display unit 38. The voice output unit 36 is a speaker and outputs audio. The display unit 38, for example, is a liquid crystal display, which displays characters, images, and the like. The voice output unit 36 and the display unit 38 constitute a notification unit 40.

[Software Information Display Control Unit]

The numerical controller 10 includes the software information display control unit 42. The software information display control unit 42 reads in the contents of the parameter information files 30 of each of the software packages stored in the software information storage unit 28, and displays the software information on the display unit 38.

Figure 3:
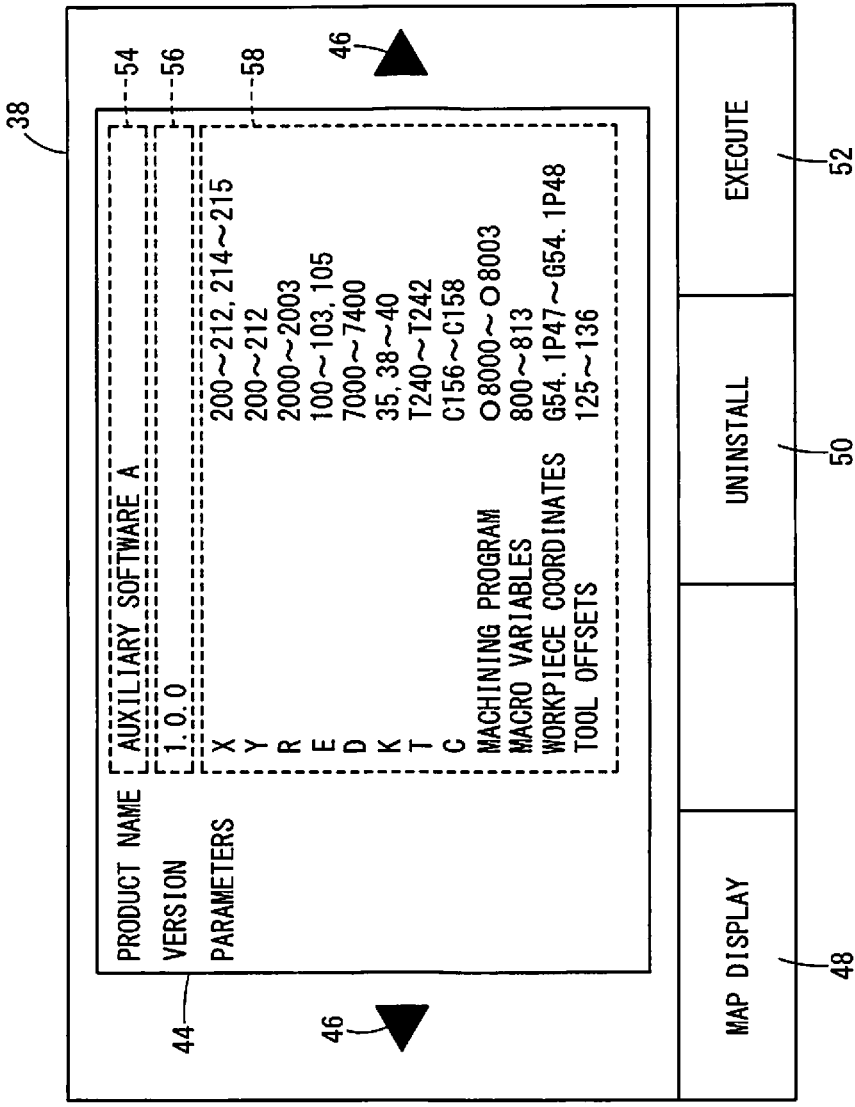
FIG. 3 is a diagram showing a display example of software information displayed on a display unit.

FIG. 3 is a diagram showing a display example of software information displayed on the display unit 38. A software information display section 44, a software selection button 46, a map display button 48, an uninstall button 50, and an execute button 52 are displayed on the display unit 38.

The software information display section 44 includes a product name display field 54, a version display field 56, and a used storage area display field 58. The product name of the currently selected software package is displayed in the product name display field 54. Selection of a software package is performed by the operator using a mouse or a touch panel to thereby operate the software selection button 46 that is displayed on the display unit 38.

The version of the currently selected software package is displayed in the version display field 56. The storage area display field 58 displays the parameter storage areas used by the currently selected software package.

Figure 5:
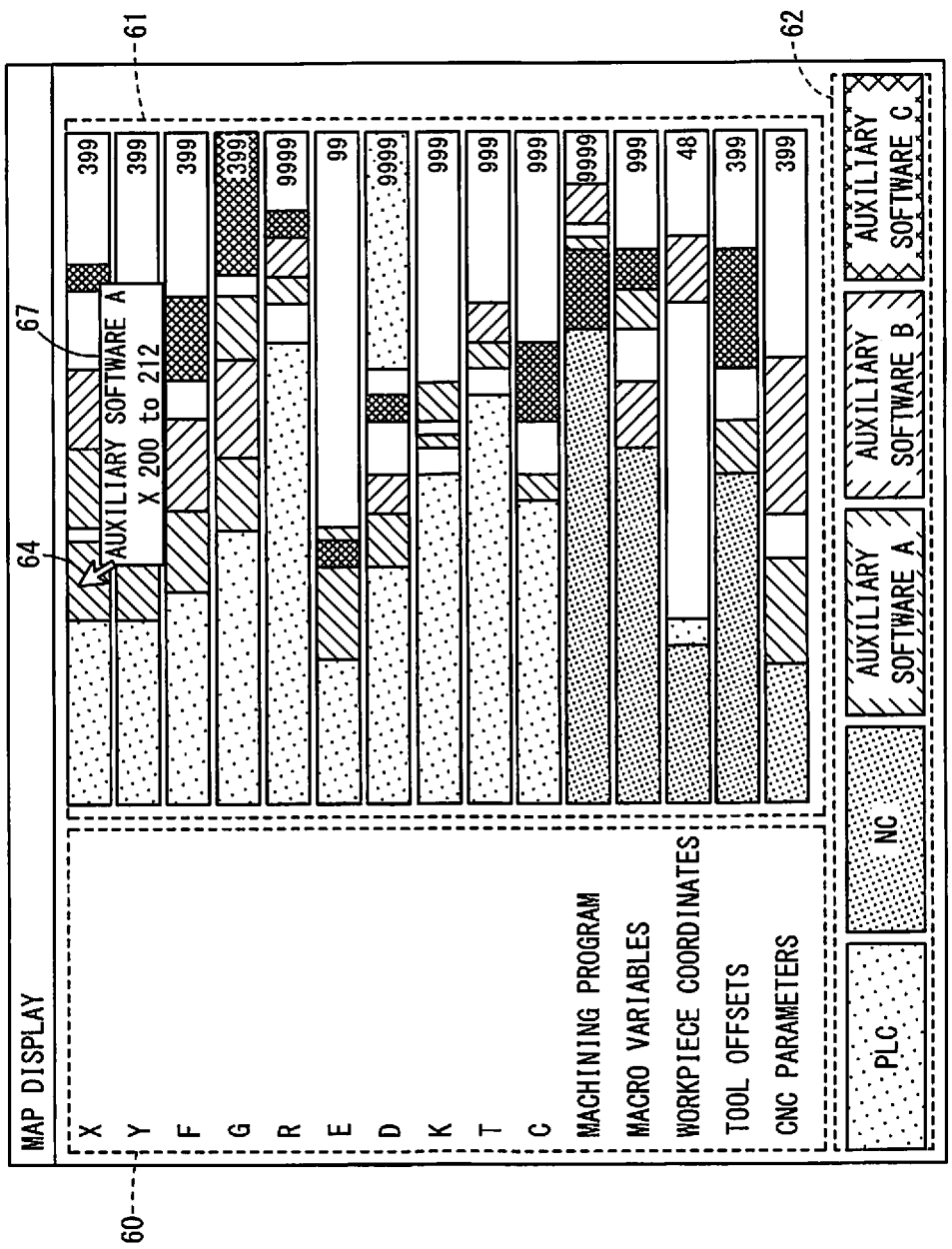
FIG. 5 is a diagram showing a display example of software information displayed on a display unit.

The map display button 48 is a button operated by the operator using a mouse or a touch panel. When the map display button 48 is operated, in the software information display section 44, information of the parameter storage areas used by each of the respective software packages is displayed on the display unit 38 in a map format, as shown in FIG. 5. Display of the map format will be described in detail later.

The uninstall button 50 is a button operated by the operator using a mouse or a touch panel. When the uninstall button 50 is operated, the currently selected software package is uninstalled.

The execute button 52 is a button operated by the operator using a mouse or a touch panel. When the execute button 52 is operated, the currently selected software package is executed.

Figure 4:
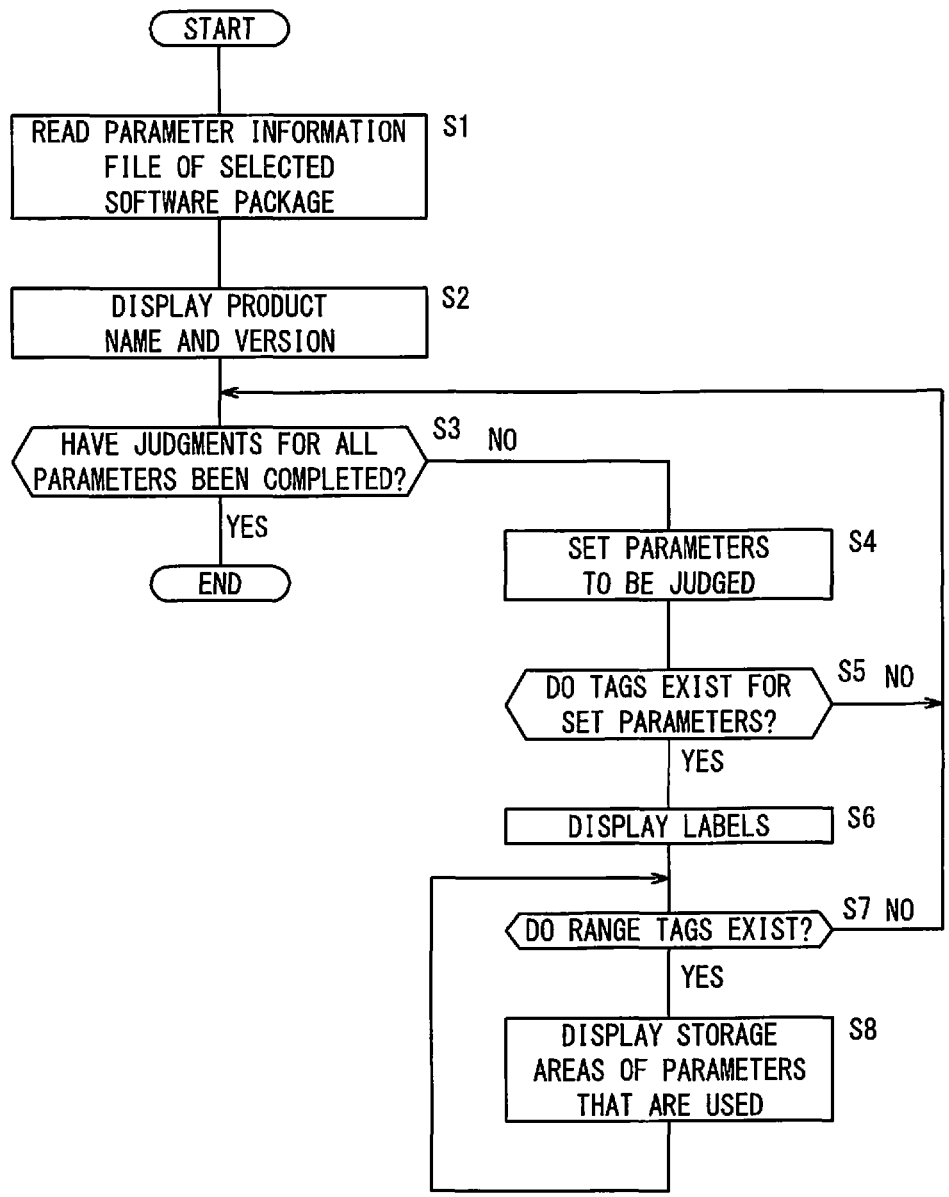
FIG. 4 is a flowchart showing a process flow by which software information is displayed on a display unit by a software information display control unit.

FIG. 4 is a flowchart showing a process flow by which software information is displayed on the display unit 38 by the software information display control unit 42. In step S1, the software information display control unit 42 reads in the parameter information file 30 of the selected software package, and then the process proceeds to step S2.

In step S2, the software information display control unit 42 extracts the product name and version from the parameter information file 30, and controls the display unit 38 so as to display the product name in the product name display field 54, and display the version in the version display field 56, whereupon the process proceeds to step S3.

In step S3, the software information display control unit 42 determines whether or not judgments have been completed as to whether or not tags indicating the parameter types exist for all of the parameters. The judgments as to whether or not tags indicating the parameter types exist are indicated by the determination in step S5, which will be described later. If the judgments have been completed as to whether or not tags indicating the parameter types exist for all of the parameters, the process is brought to an end, whereas if the judgments have not been completed as to whether or not tags indicating the parameter types exist for all of the parameters, the process proceeds to step S4.

In step S4, the software information display control unit 42 sets a parameter on which to carry out a judgment as to whether or not tags indicating the parameter type exist, and then the process proceeds to step S5. The parameter to be judged is set sequentially in order of the X signals, the Y signals, the F signals, the G signals, the internal relay R, the extra relay E, the holding memory D, the holding memory K, the timer T, the counter C, the machining program, the macro variables, the workpiece coordinates, the tool offsets, and the CNC parameters.

In step S5, the software information display control unit 42 determines whether or not tags indicating the parameter type exist within the parameter information file 30 for the set parameter. Concerning the set parameter, in the case that tags indicative of the parameter type exist, the process proceeds to step S6, and in the case that tags indicative of the parameter type do not exist, the process returns to step S3.

In step S6, the software information display control unit 42 outputs a command signal to the display unit 38, so that a label indicating the set parameter is displayed in the used storage area display field 58. In step S7, the software information display control unit 42 determines whether or not range tags exist in a lower ranking of the elements of the set parameter type within the parameter information file 30. If the range tags exist, the process proceeds to step S8, and if the range tags do not exist, the process returns to step S3.

In step S8, the software information display control unit 42 reads in the contents of the elements of the range tags, and outputs a command signal to the display unit 38, so as to display in the used storage area display field 58 the parameter storage areas used by the selected software package.

FIG. 5 is a diagram showing a display example of software information displayed on the display unit 38. In the display example shown in FIG. 5, unlike the display example shown in FIG. 3, information of the parameter storage areas used by each of the respective software packages is displayed in a map format. As noted previously, when the map display button 48 is operated at the time that the screen shown in FIG. 3 is displayed on the display unit 38, in the software information display section 44, information of the parameter storage areas used by the respective software packages is displayed on the display unit 38 in a map format. A label display section 60, a map display section 61, and a legend display section 62 are displayed on the display unit 38.

Figure 6:
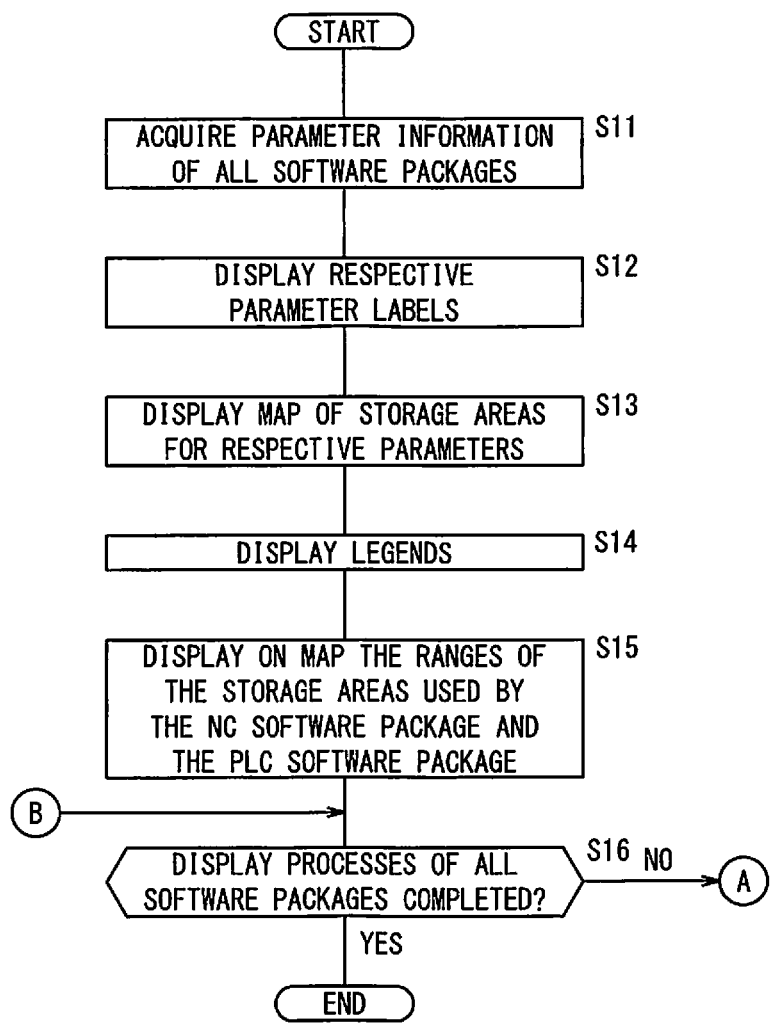
FIG. 6 is a flowchart showing a process flow by which software information is displayed in a map format on a display unit by a software information display control unit.
Figure 7:
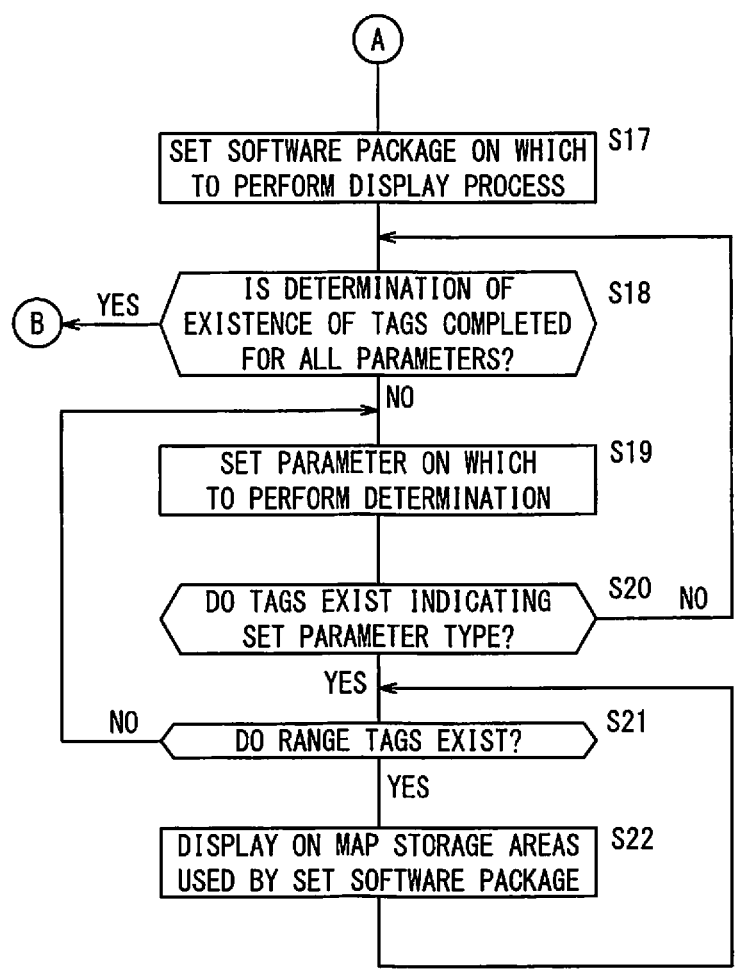
FIG. 7 is a flowchart showing a process flow by which software information is displayed in a map format on a display unit by a software information display control unit.

FIGS. 6 and 7 are flowcharts showing a process flow by which software information is displayed in a map format on the display unit 38 by the software information display control unit 42. In step S11, the software information display control unit 42 reads in the parameter information files 30 of all of the software packages, and then the process proceeds to step S12.

In step S12, the software information display control unit 42 controls the display unit 38 so as to display, in the label display section 60, labels indicative of the respective parameters, whereupon the process proceeds to step S13. In step S13, the software information display control unit 42 controls the display unit 38 in a manner so that, in the map display section 61, a map is displayed corresponding to the total range of the storage areas of each of the parameters secured in the parameter storage unit 24. Further, in the software information display control unit 42, the display unit 38 is controlled in a manner so that the maximum values of the addresses of the storage areas of the respective parameters are displayed on the right side of the map, and then the process proceeds to step S14. For example, in the parameter storage unit 24, a storage area ranging from addresses 0 to 399 is reserved for the X signals. The software information display control unit 42 displays a map corresponding to addresses 0 to 399, and controls the display unit 38 so as to display the maximum value "399" of the storage area for the X signals on the right side of the map.

In step S14, the software information display control unit 42 controls the display unit 38 so as to display, in the legend display section 62, legends indicating a correspondence between each of the software packages and a display identifying each of the software packages, whereupon the process proceeds to step S15. As shown in FIG. 5, displays that identify the respective software packages are shown in the form of displays in which hatching or dots thereof are changed. Further, the displays may be shown in different colors.

In step S15, the display unit 38 is controlled in a manner so that, in the software information display section 44, and on the maps of the respective parameters, which are set for display in the map display section 61, portions corresponding to the storage areas used by the NC software package 14 and the PLC software package 16 are displayed in a manner identifying the NC software package 14 and the PLC software package 16, whereupon the process proceeds to step S16.

In step S16, the software information display control unit 42 determines whether or not the display process of the storage areas for the parameters used by the software packages has been completed for all of the software packages. In the case that the display process of the parameter storage areas has been completed for all of the software packages, the process is brought to an end, whereas, in the case that the display process of the parameter storage areas has not been completed for all of the software packages, the process proceeds to step S17.

In step S17, the software information display control unit 42 sets the software packages for performing the process of displaying the parameter storage areas, whereupon the process proceeds to step S18. In step S18, the software information display control unit 42 determines whether or not judgments have been completed as to whether or not tags indicating the parameter types exist, for all of the parameters. The judgments as to whether or not tags indicating the parameter types exist are indicated by the determination in step S20. If the judgments have been completed as to whether or not tags indicating the parameter types exist, for all of the parameters, the process returns to step S16, whereas, if the judgments have not been completed as to whether or not tags indicating the parameter types exist, for all of the parameters, the process proceeds to step S19.

In step S19, the software information display control unit 42 sets a parameter on which to carry out a determination as to whether or not tags indicating the parameter type exist, and then the process proceeds to step S20. In step S20, the software information display control unit 42 determines whether or not tags indicating the set parameter type exist within the parameter information file 30 of the set software package. In the case that tags indicative of the set parameter type exist, the process proceeds to step S21, whereas, in the case that tags indicative of the set parameter type do not exist, the process returns to step S18.

In step S21, the software information display control unit 42 determines whether or not range tags exist in a lower ranking of the elements of the set parameter type within the parameter information file 30 of the set software package. If the range tags exist, the process proceeds to step S22, and if the range tags do not exist, the process returns to step S19.

In step S22, the software information display control unit 42 controls the display unit 38 so as to read in the contents of the elements of the range tags, and on the map of the parameter that was set for display in the map display section 61, portions corresponding to the storage areas used by the set software package are displayed in a manner identifying the set software package.

Moreover, as shown in FIG. 5, when a pointer 64 is moved on the map displayed in the map display section 61 by the operator operating a mouse, a touch panel, or the like, the software information display control unit 42 may control the display unit 38 in a manner so as to display, in a sub-window 67, the range of the parameter storage area corresponding to the position of the pointer 64, and the product name of the software package that uses the parameter of that storage range.

[Updating of Parameter Information Files]

Although the manufacturer of the software packages creates the parameter information files 30, it is conceivable that a portion or all of the parameter storage areas used by the software packages may not be described in the parameter information files 30. Thus, when the parameters are written responsive to requests for writing parameters from the auxiliary software package A 18, the auxiliary software package B 20, and the auxiliary software package C 22, the parameter management unit 26 confirms the contents of the parameter information files 30, and if addresses of the storage areas of parameters for which writing requests have been made are not described in the parameter information files 30, the addresses therefor are added to the parameter information files 30.

Figure 8:
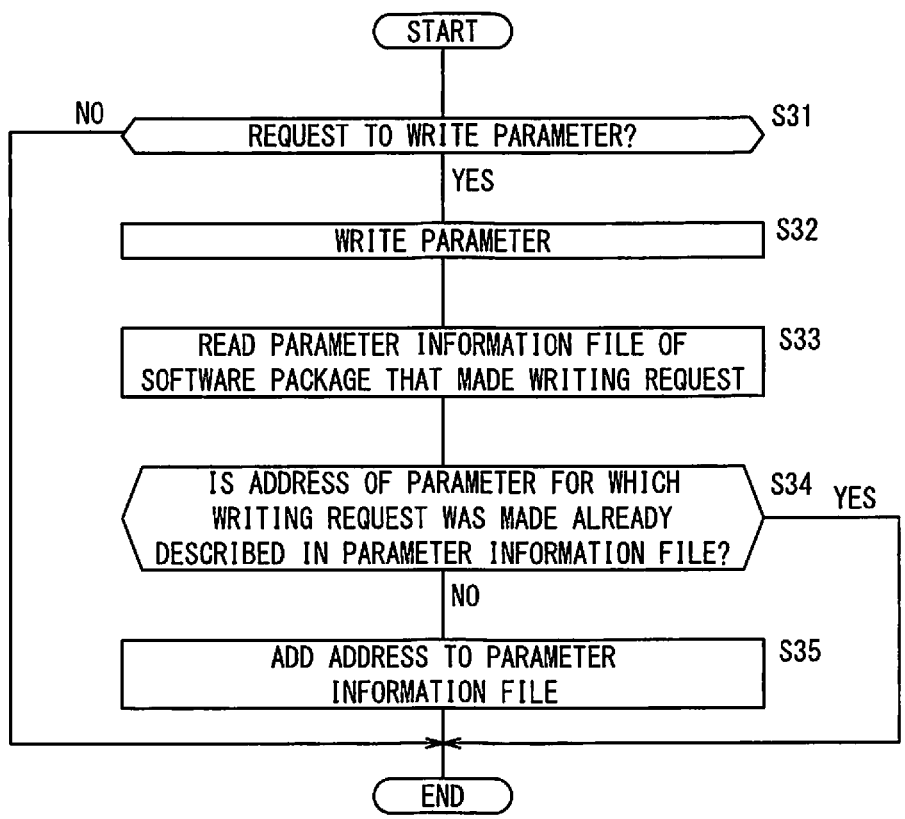
FIG. 8 is a flowchart showing a process flow by which a parameter information file stored in a software information storage unit is updated by a parameter management unit.

FIG. 8 is a flowchart showing a process flow by which a parameter information file 30 stored in the software information storage unit 28 is updated by the parameter management unit 26.

In step S31, the parameter management unit 26 determines whether or not there has been a request to write a parameter into the parameter storage unit 24 from any one of the software packages from among the auxiliary software package A 18, the auxiliary software package B 20, and the auxiliary software package C 22. If there is such a writing request, the process proceeds to step S32, whereas, if there is not such a writing request, the process is terminated. When a parameter writing request is transmitted from the software package, there is transmitted from the software package the type of parameter to be written, the address of the storage area for the parameter, and information of the parameter content to be written.

In step S32, the parameter management unit 26 writes the parameter for which the writing request was made, and then the process proceeds to step S33. In step S33, in the parameter management unit 26, the parameter information file 30 of the software package that made the writing request is read in from the software information storage unit 28, and then the process proceeds to step S34.

In step S34, the parameter management unit 26 determines whether or not an address of the storage area for the parameter for which the writing request was made is already described in the parameter information file 30 that was read in step S33. In the case that the address of the storage area for the parameter for which the writing request was made is already described in the parameter information file 30, the process is terminated. On the other hand, if an address therefor is not described in the parameter information file 30, the process proceeds to step S35.

In step S35, the parameter management unit 26 adds the address of the storage area for the parameter for which the writing request was made to the parameter information file 30, whereupon the process is brought to an end.

[Installation Control]

As shown in FIG. 1, an external storage device 66 is connected to the numerical controller 10. The external storage device 66, for example, is a USB memory, a memory card, a server on the cloud, or the like. In the external storage device 66, there are stored a program file 34 and a parameter information file 30 for an auxiliary software package D to be installed in the numerical controller 10.

The numerical controller 10 includes a comparison judgment unit 68 and an installation control unit 70. For each parameter type, the comparison judgment unit 68 compares the storage areas for the parameters used by the software package (auxiliary software package D) to be installed, and the storage areas of parameters used by the already installed software packages (the NC software package 14, the PLC software package 16, the auxiliary software package A 18, the auxiliary software package B 20, and the auxiliary software package C 22). In the case that, as a result of the comparison performed in the comparison judgment unit 68, the parameter storage areas used by the software package to be installed do not overlap with the parameter storage areas used by the already installed software packages, the installation control unit 70 installs the auxiliary software package D in the numerical controller 10. On the other hand, in the case that the parameter storage areas used by the software package to be installed overlap with the parameter storage areas used by the already installed software packages, the installation control unit 70 prohibits installation of the auxiliary software package D in the numerical controller 10.

FIG. 9 is a flowchart showing a process flow performed in the comparison judgment unit 68 and the installation control unit 70. In step S41, the comparison judgment unit 68 reads in the parameter information files 30 of the already installed software packages from the software information storage unit 28, and then the process proceeds to step S42. In step S42, the comparison judgment unit 68 reads in the parameter information file 30 of the software package to be installed from the external storage device 66, and then the process proceeds to step S43.

In step S43, the comparison judgment unit 68 compares the parameter storage areas used by the software package to be installed with the parameter storage areas used by the already installed software packages, and determines whether or not both parameter storage areas overlap with each other. In the case that both parameter storage areas overlap with each other, the process proceeds to step S45, whereas if they do not overlap with each other, the process proceeds to step S44.

In step S44, the installation control unit 70 installs the software package that is stored in the external storage device 66 (e.g., the auxiliary software package D) in the numerical controller 10, and the process is brought to an end. For example, when the auxiliary software package D is installed in the numerical controller 10, in the same manner as the other software packages, the program file 34 and the parameter information file 30 thereof are stored in the software information storage unit 28.

In step S45, installation of the software package that is stored in the external storage device 66 in the numerical controller 10 is prohibited by the installation control unit 70, while in addition, the voice output unit 36 and the display unit 38 are controlled so that a notification is issued to the operator to the effect that the parameter storage areas used by the software package to be installed overlap with the parameter storage areas used by the already installed software packages, whereupon the process is brought to an end.

[Operations and Effects]

For example, in the case that the auxiliary software package A 18 uses the X signals, which are of the same parameter type as the parameters used by the PLC software package 16, if the contents of the storage areas for the X signals used by the PLC software package 16 were overwritten by the auxiliary software package A 18, there is a concern that the PLC software package 16 may cause an abnormal operation to occur. Therefore, it has been necessary to manage the storage areas for the parameters used by the respective software packages.

Thus, according to the present embodiment, the storage unit 32 (software information storage unit 28) is provided, which stores, for each of the software packages, a parameter information file 30 in which information of the parameter storage areas used by the respective software packages is described for each of the parameter types. Consequently, it is possible to manage the parameter storage areas used by the respective software packages.

Further, according to the present embodiment, the storage unit 32 includes the program files 34 in which programs that define the processes performed by the respective software packages are described for each of the software packages, and stores the parameter information files 30 and the program files 34 in pairs for each of the software packages. Consequently, it is possible to manage the storage areas for the parameters used by the respective software packages in association with the program files 34 of the respective software packages.

According to the present embodiment, there is further included the display unit 38 on which there is displayed information of the parameter storage areas described in the parameter information files 30 and which is used by the respective software packages. In accordance with this feature, it is possible to provide to the operator the information of the parameter storage areas used by the respective software packages.

Further, according to the present embodiment, the display unit 38 identifies and displays information of the parameter storage areas described in the parameter information files 30 and which is used by the respective software packages. In accordance with this feature, in a displaying manner so that the operator can grasp the information at a glance, it is possible to provide information of the storage areas for the parameters used by the respective software packages.

According to the present embodiment, there is further included the comparison judgment unit 68 which, when a software package is to be installed in the numerical controller 10, determines whether or not the parameter storage areas used by the software package to be installed overlap with the parameter storage areas used by the already installed software packages, for each of the parameter types. Furthermore, there is included the installation control unit 70 which prohibits installation of the software package when it is determined in the comparison judgment unit 68 that the parameter storage areas used by the software package to be installed overlap with the parameter storage areas used by the already installed software packages. Consequently, it is possible to prevent in advance installation of software packages for which the storage areas used thereby overlap with the storage areas of the respective parameter types used by the already installed software packages.

Further, there is included the notification unit 40 which issues a notification to the operator when it is determined in the comparison judgment unit 68 that the parameter storage areas used by the software package to be installed overlap with the parameter storage areas used by the already installed software packages. Consequently, it is possible to provide a notification to the operator to the effect that one is attempting to install a software package that uses storage areas that overlap with the storage areas of the respective parameter types used by the already installed software packages.

Further, according to the present embodiment, there is provided the parameter management unit 26. When a software package has written information of the parameters in a storage area which is not described in the parameter information file 30 of the software package, as the storage areas used by the software package, the parameter management unit 26 adds the storage area in which the software package has written the information of the parameters, to the parameter information file 30 of the software package which has written the information of the parameters. In accordance with this feature, even if there is missing information in the information of the parameter storage areas used by the software packages in the parameter information files 30, the parameter information files 30 can be updated, and the information of the parameter storage areas used by the software packages can be supplemented.

Further, according to the present embodiment, the parameters used by the respective software packages are at least one type from among PLC signals used in a sequence control by a PLC, a machining program defining a machined shape of a workpiece, tool offsets which are values of a length and diameter of a tool for machining a workpiece, macro variables used in the machining program, data of coordinates serving as reference points of respective coordinates used in the machining program, and CNC parameters which are setting values of the machine tool 12. In accordance with this feature, it is possible to manage the parameters used to control the machine tool 12, and it is possible to prevent abnormal operations of the machine tool 12.

[Technical Concepts Obtained from the Embodiment]

Technical concepts which can be grasped from the above-described embodiment will be described below.

The numerical controller (10) in which a plurality of software packages using the same type of parameters are installed includes the parameter storage unit (24) having a plurality of storage areas for storing the parameters, for each of parameter types, and a storage unit (32) configured to store, for each of the software packages, a parameter information file (30) in which information of the storage areas used by each of the software packages is described for each of the parameter types. Consequently, it is possible to manage the parameter storage areas used by the respective software packages.

Further, in the above-described numerical controller (10), the storage unit (32) may include, for each of the software packages, the program file (34) in which programs that define the processes performed by each of the software packages are described, and may store, for each of the software packages, the parameter information file (30) and the program file (34) in pairs. Consequently, it is possible to manage the storage areas for the parameters used by the software packages in association with the program files (34) of the respective software packages.

The above-described numerical controller (10) may further include a display unit (38) configured to display information of the storage areas described in the parameter information file (30) and which is used by each of the software packages. In accordance with this feature, it is possible to provide to the operator the information of the parameter storage areas used by each of the software packages.

In the above-described numerical controller (10), the display unit (38) may identify and display, for each of the software packages, the information of the storage areas described in the parameter information file (30) and which is used by each of the software packages. In accordance with this feature, in a displaying manner so that the operator can grasp the information at a glance, it is possible to provide information of the storage areas for the parameters used by the software packages.

In the above-described numerical controller (10), the external storage device (66) may be connected to the numerical controller (10) when a software package is to be installed in the numerical controller (10), and the external storage device (66) may store a parameter information file (30) in which information of the storage areas used by the software package to be installed in the numerical controller (10) is described for each of the parameter types, and a program file (34) in which programs that define processing performed by the software package to be installed are described. In addition, the above-described numerical controller (10) may further include the comparison judgment unit (68) configured to determine whether or not the storage areas used by the software package to be installed overlap with the storage areas used by the already installed software packages, for each of the parameter types, and the installation control unit (70) configured to prohibit installation of the software package, when it is determined in the comparison judgment unit (68) that the storage areas used by the software package to be installed overlap with the storage areas used by the already installed software packages. Consequently, it is possible to prevent in advance installation of a software package for which the storage areas used thereby overlap with the storage areas of the respective parameter types used by the already installed software packages.

In the above-described numerical controller (10), the external storage device (66) may be connected to the numerical controller (10) when a software package is to be installed in the numerical controller (10), and the external storage device (66) may store a parameter information file (30) in which information of the storage areas used by the software package to be installed in the numerical controller (10) is described for each of the parameter types, and a program file (34) in which programs that define processing performed by the software package to be installed are described. In addition, the above-described numerical controller (10) may further include the comparison judgment unit (68) configured to determine whether or not the storage areas used by the software package to be installed overlap with the storage areas used by the already installed software packages, for each of the parameter types, and the notification unit (40) configured to issue a notification to the operator, when it is determined in the comparison judgment unit (68) that the storage areas used by the software package to be installed overlap with the storage areas used by the already installed software packages. Consequently, it is possible to provide a notification to the operator to the effect that one is attempting to install a software package that uses storage areas that overlap with the storage areas of the respective parameter types used by the already installed software packages.

In the above-described numerical controller (10), there may further be included the parameter management unit (26), wherein, when a software package has written information of the parameters in a storage area which is not described in the parameter information file (30) as the storage areas used by the software package, the parameter management unit adds the storage area in which the software package has written the information of the parameters, to the parameter information file (30) of the software package which has written the information of the parameters. In accordance with this feature, even if there is missing information in the information of the areas for storing the parameters in the parameter information files (30), the parameter information files (30) can be updated, and the information of the areas for storing the parameters can be supplemented.

In the above-described numerical controller (10), the parameters used by the software packages are at least one type from among PLC signals used in a sequence control by a PLC, a machining program defining a machined shape of a workpiece, tool offsets which are values of a length and diameter of a tool for machining a workpiece, macro variables used in the machining program, data of coordinates serving as reference points of respective coordinates used in the machining program, and CNC parameters which are setting values of the machine tool (12). In accordance with this feature, it is possible to manage the parameters used to control the machine tool (12), and it is possible to prevent abnormal operations of the machine tool (12).

In a method of controlling a numerical controller (10) having a plurality of storage areas for storing parameters, for each of parameter types, and in which a plurality of software packages using the same type of parameters are installed, the method includes a parameter information storage step of storing in a storage unit (32), for each of the software packages, a parameter information file (30) in which information of the storage areas used by each of the software packages is described for each of the parameter types. Consequently, it is possible to manage the parameter storage areas used by each of the software packages.

In the above-described method of controlling the numerical controller (10), there may further be included a program storage step of storing in the storage unit (32), for each of the software packages, a program file (34) in which programs that define processing performed by each of the software packages are described, in pairs with the parameter information file (30). Consequently, it is possible to manage the storage areas for the parameters used by the respective software packages in association with the program files (34) of the respective software packages.

In the above-described method of controlling the numerical controller (10), there may further be included a displaying step of displaying on the display unit (38) information of the storage areas described in the parameter information file (30) and which is used by each of the software packages. In accordance with this feature, it is possible to provide to the operator the information of the parameter storage areas used by the software packages.

In the above-described method of controlling the numerical controller (10), the displaying step may identify and display on the display unit (38), for each of the software packages, the information of the storage areas stored in the parameter information file (30) and which is used by each of the software packages. In accordance with this feature, in a displaying manner so that the operator can grasp the information at a glance, it is possible to provide information of the storage areas for the parameters used by the software packages.

In the above-described method of controlling the numerical controller (10), the external storage device (66) may be connected to the numerical controller (10) when a software package is to be installed in the numerical controller (10), and the external storage device (66) may store a parameter information file (30) in which information of the storage areas used by the software package to be installed in the numerical controller (10) is described for each of the parameter types, and a program file (34) in which programs that define processing performed by the software package to be installed are described. In addition, the above-described method may further include a comparison judgment step of determining whether or not the storage areas used by the software package to be installed overlap with the storage areas used by the already installed software packages, for each of the parameter types, and an installation prohibition step of prohibiting installation of the software package or issuing a notification to an operator, when it is determined in the comparison judgment step that the storage areas used by the software package to be installed overlap with the storage areas used by the already installed software packages. Consequently, it is possible to prevent in advance installation of a software package for which the storage areas used thereby overlap with the storage areas of the respective parameter types used by the already installed software packages. Alternatively, it is possible to provide a notification to the operator to the effect that one is attempting to install a software package that uses storage areas that overlap with the storage areas of the respective parameter types used by the already installed software packages.

In the above-described method of controlling the numerical controller (10), there may further be included a parameter information adding step of, when a software packages has written information of the parameters in a storage area which is not described in the parameter information file (30) as the storage areas used by the software package, adding the storage area in which the software package has written the information of the parameters, to the parameter information file (30) of the software package which has written the information of the parameters. In accordance with this feature, even if there is missing information in the information of the areas for storing the parameters in the parameter information files (30), the parameter information files (30) can be updated, and the information of the areas for storing the parameters can be supplemented.

In the above-described method of controlling the numerical controller (10), the parameters used by the software packages are at least one type from among PLC signals used in a sequence control by a PLC, a machining program defining a machined shape of a workpiece, tool offsets which are values of a length and diameter of a tool for machining a workpiece, macro variables used in the machining program, data of coordinates serving as reference points of respective coordinates used in the machining program, and CNC parameters which are setting values of the machine tool (12). In accordance with this feature, it is possible to manage the parameters used to control the machine tool (12), and it is possible to prevent abnormal operations of the machine tool (12).

While the invention has been particularly shown and described with reference to preferred embodiments, it will be understood that variations and modifications can be effected thereto by those skilled in the art without departing from the scope of the invention as defined by the appended claims.

What is claimed is:

1. A numerical controller in which a plurality of software packages using same type of parameters are installed, comprising:
    a parameter storage unit having a plurality of storage areas configured to store the parameters, for each of parameter types;
    a storage unit configured to store, for each of the software packages, a parameter information file in which information of the storage areas used by each of the software packages is described for each of the parameter types, wherein an external storage device is connected to the numerical controller when a software package is to be installed in the numerical controller, the external storage device storing a parameter information file in which information of the storage areas used by the software package to be installed in the numerical controller is described for each of the parameter types, and a program file in which programs that define processing performed by the software package to be installed are described;
    a comparison judgment unit configured to determine whether or not the storage areas used by the software package to be installed overlap with the storage areas used by the already installed software packages, for each of the parameter types; and
    an installation control unit configured to prohibit installation of the software package when the comparison judgment unit determines that the storage areas used by the software package to be installed overlap with the storage areas used by the already installed software packages.

2. The numerical controller according to claim 1, wherein the storage unit includes, for each of the software packages, a program file in which programs that define processing performed by each of the software packages are described, and the storage unit stores, for each of the software packages, the parameter information file and the program file in pairs.

3. The numerical controller according to claim 1, further comprising a display unit configured to display information of the storage areas described in the parameter information file and which is used by each of the software packages.

4. The numerical controller according to claim 3, wherein the display unit identifies and displays, for each of the software packages, the information of the storage areas described in the parameter information file and which is used by each of the software packages.

5. The numerical controller according to claim 1, further comprising a notification unit configured to issue a notification to an operator, when the comparison judgment unit determines that the storage areas used by the software package to be installed overlap with the storage areas used by the already installed software packages.

6. The numerical controller according to claim 1, further comprising a parameter management unit, wherein, when a software package has written information of the parameters in a storage area which is not described in the parameter information file as the storage areas used by the software package, the parameter management unit adds the storage area in which the software package has written the information of the parameters, to the parameter information file of the software package which has written the information of the parameters.

7. The numerical controller according to claim 1, wherein the parameters used by the software packages are at least one type from among PLC signals used in a sequence control by a PLC, a machining program defining a machined shape of a workpiece, tool offsets which are values of a length and diameter of a tool for machining a workpiece, macro variables used in the machining program, data of coordinates serving as reference points of respective coordinates used in the machining program, and CNC parameters which are setting values of a machine tool.

8. A method of controlling a numerical controller having a plurality of storage areas configured to store parameters, for each of parameter types, and in which a plurality of software packages using same type of the parameters are installed, the method comprising:
    a parameter information storage step of storing in a storage unit, for each of the software packages, a parameter information file in which information of the storage areas used by each of the software packages is described for each of the parameter types, wherein an external storage device is connected to the numerical controller when a software package is to be installed in the numerical controller, the external storage device storing a parameter information file in which information of the storage areas used by the software package to be installed in the numerical controller is described for each of the parameter types, and a program file in which programs that define processing performed by the software package to be installed are described;
    a comparison judgment step of determining whether or not the storage areas used by the software package to be installed overlap with the storage areas used by the already installed software packages, for each of the parameter types; and
    an installation prohibition step of prohibiting installation of the software package or issuing a notification to an operator when it is determined in the comparison judgment step that the storage areas used by the software package to be installed overlap with the storage areas used by the already installed software packages.

9. The method of controlling the numerical controller according to claim 8, further comprising a program storage step of storing in the storage unit, for each of the software packages, a program file in which programs that define processing performed by each of the software packages are described, in pairs with the parameter information file.

10. The method of controlling the numerical controller according to claim 8, further comprising a displaying step of displaying on a display unit information of the storage areas described in the parameter information file and which is used by each of the software packages.

11. The method of controlling the numerical controller according to claim 10, wherein the displaying step identifies and displays on the display unit, for each of the software packages, the information of the storage areas stored in the parameter information file and which is used by each of the software packages.

12. The method of controlling the numerical controller according to claim 8, further comprising a parameter information adding step of, when a software package has written information of the parameters in a storage area which is not described in the parameter information file as the storage areas used by the software package, adding the storage area in which the software package has written the information of the parameters, to the parameter information file of the software package which has written the information of the parameters.

13. The method of controlling the numerical controller according to claim 8, wherein the parameters used by the software packages are at least one type from among PLC signals used in a sequence control by a PLC, a machining program defining a machined shape of a workpiece, tool offsets which are values of a length and diameter of a tool for machining a workpiece, macro variables used in the machining program, data of coordinates serving as reference points of respective coordinates used in the machining program, and CNC parameters which are setting values of a machine tool.

14. A numerical controller in which a plurality of software packages using same type of parameters are installed, comprising:
a parameter storage unit having a plurality of storage areas configured to store the parameters, for each of parameter types;
a storage unit configured to store, for each of the software packages, a parameter information file in which information of the storage areas used by each of the software packages is described for each of the parameter types, wherein an external storage device is connected to the numerical controller when a software package is to be installed in the numerical controller, the external storage device storing a parameter information file in which information of the storage areas used by the software package to be installed in the numerical controller is described for each of the parameter types, and a program file in which programs that define processing performed by the software package to be installed are described;
a comparison judgment unit configured to determine whether or not the storage areas used by the software package to be installed overlap with the storage areas used by the already installed software packages, for each of the parameter types; and
a notification unit configured to issue a notification to an operator, when the comparison judgment unit determines that the storage areas used by the software package to be installed overlap with the storage areas used by the already installed software packages.

15. The numerical controller according to claim 14, wherein the storage unit includes, for each of the software packages, a program file in which programs that define processing performed by each of the software packages are described, and the storage unit stores, for each of the software packages, the parameter information file and the program file in pairs.

16. The numerical controller according to claim 14, further comprising a display unit configured to display information of the storage areas described in the parameter information file and which is used by each of the software packages.

17. The numerical controller according to claim 16, wherein the display unit identifies and displays, for each of the software packages, the information of the storage areas described in the parameter information file and which is used by each of the software packages.

18. The numerical controller according to claim 14, further comprising a parameter management unit, wherein, when a software package has written information of the parameters in a storage area which is not described in the parameter information file as the storage areas used by the software package, the parameter management unit adds the storage area in which the software package has written the information of the parameters, to the parameter information file of the software package which has written the information of the parameters.

19. The numerical controller according to claim 14, wherein the parameters used by the software packages are at least one type from among PLC signals used in a sequence control by a PLC, a machining program defining a machined shape of a workpiece, tool offsets which are values of a length and diameter of a tool for machining a workpiece, macro variables used in the machining program, data of coordinates serving as reference points of respective coordinates used in the machining program, and CNC parameters which are setting values of a machine tool.

* * * * *